Jan. 16, 1934.  J. H. COHEN  1,943,913
WIRE REEL
Original Filed April 23, 1928
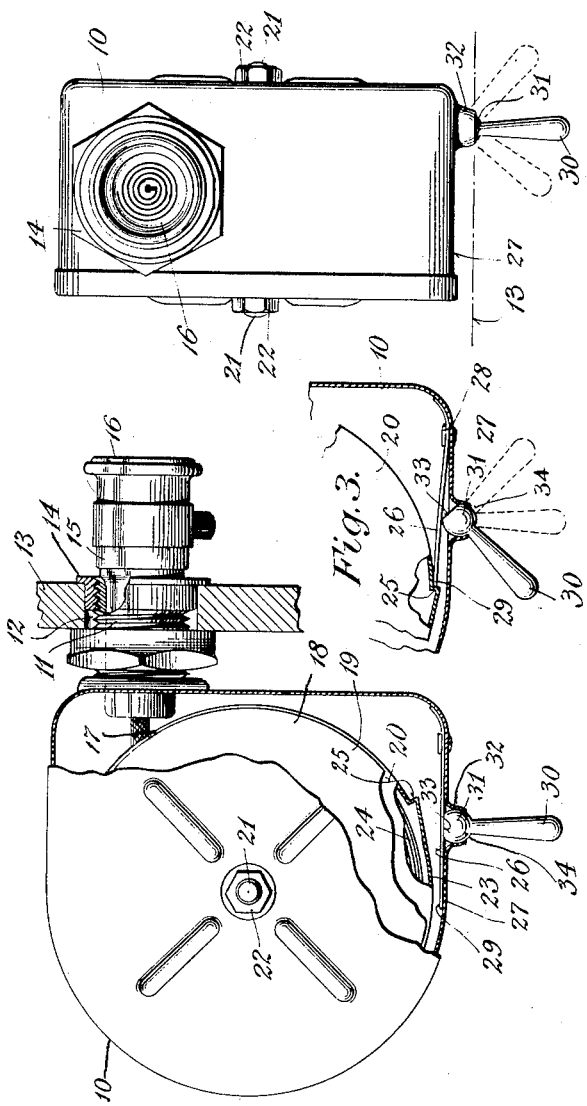
INVENTOR.
Joseph H. Cohen,
BY
ATTORNEY Patented Jan. 16, 1934

1,943,913

UNITED STATES PATENT OFFICE 1,943,913

WIRE REEL

Joseph H. Cohen, Bridgeport, Conn.

Application April 23, 1928, Serial No. 272,263
Renewed March 1, 1933

10 Claims. (Cl. 242—107)

This invention relates to cable-carrying reels for cigar-lighters, trouble lamps, etc.

An object of this invention is to provide means for holding a spring-biased cable-carrying reel against retrograde movement when the user wishes to keep a desired amount of the cable paid-off the reel. When the reel is held against rewinding, a trouble lamp may be left in any desired position, and a cigar-lighter may be passed around without the tendency of the rewinding spring to pull the lighter back into its socket on the reel.

One of the more important features of the present invention is the provision of a device for the purpose stated, which is extremely simple, relatively inexpensive to manufacture, and efficient and handy in use.

In the accompanying drawing which shows two embodiments of this invention—

Figure 1 is a side view, partly in section, of a cigar-lighter showing the present invention applied thereto.

Fig. 2 is a front elevation of the device shown in Fig. 1, the position of the lower edge of the instrument board being shown in dot-and-dash lines.

Fig. 3 is a fragmentary side sectional view, showing the device of the present invention in operative position.

Fig. 4 is a fragmentary sectional view of a modification of the device shown in Figs. 1 to 3.

Fig. 5 is a view similar to Fig. 4, showing the positions of the parts after the reel has been back-checked.

As shown in the accompanying drawing, the device of the present invention comprises a reel casing 10 having secured to it an attaching sleeve 11 adapted to pass through an aperture 12 in an instrument board 13 to be clamped thereon by means of a clamping nut 14. The sleeve 11 is adapted normally to receive and hold a nozzle 15 which may contain at its end a cigar-lighting unit 16, or, if desired, a trouble lamp or other electrical appliance, it being old in the art to substitute cigar-lighter units for trouble lamps, etc.

The nozzle 15 is connected to a cable 17 which is wound on a reel 18 comprising side disks 19 and 20. The reel 18 is rotatably mounted on a stud shaft 21 which is anchored against rotation in the reel casing 10 by a lock-nut 22. The disk 20 is provided with a flange 23 to which one end of a re-winding spring 24 is anchored, while the other end is fastened to the shaft 21. The wires of the cable 17 are connected to the disks 19 and 20 respectively, the latter being connected to a source of current in the usual or any desired way.

It frequently occurs, especially when the nozzle 15 is connected to a trouble lamp, that the user desires to keep the nozzle 15 in some position removed from the sleeve 11, as, for instance, under the car when making repairs or adjustments or near one of the wheels when changing a tire at night, and therefore means have been provided for preventing re-winding movement of the reel 19 when desired.

According to the present invention, this is accomplished by providing one or more ledges or abutments 25 on the flange 23 of the disk 20 which constitutes part of the reel, and a back-check pawl which may cooperate with these ledges 25 to prevent backward movement of the reel under the influence of the spring 24.

This back-check pawl in the form of the invention shown, is in the form of a flat or leaf spring 26 secured to the bottom wall 27 of the casing 10 by a rivet 28 or other suitable means. The spring 26 is so formed that it normally occupies the position shown in Fig. 1 where it is out of engagement with the flange 23 of the reel. When it is raised to operative position, however, by means hereinafter described, its end 29 is brought into engagement with the flange 23 and acts as a brake against the flange to retard movement of the reel in either winding or unwinding direction. With the pawl raised to operative position when the desired amount of cable is paid-off the reel and the cable is released, the reel is allowed to move in winding direction until one of the ledges 25 of the flange 23 engages the end 29 of the spring, whereupon further retrograde movement of the reel is prevented and the trouble light or cigar-lighter may be left where the user desires without the reel tending to draw the cable in.

The means provided by the present invention for controlling the back-check pawl is extremely simple and easy to make and assemble. It comprises, in the form shown, a lever 30 which protrudes through the bottom wall 27 of the casing for manual operation. The lever 30 is provided with a spherical or ball-shaped bearing portion 31 lying in a ball-shaped socket 32 formed in the bottom wall 27 of the casing directly beneath the place where the leaf-spring back-check pawl 26 is located. The top of the ball-shaped bearing portion 31 has a flat surface 33 against which the leaf-spring 26 normally presses. This holds the lever 30 in the socket 32 and keeps it normally perpendicular with relation to the bottom wall 27, as shown in Figs. 1 and 2. When it is desired to make the back-check pawl operative, it is merely necessary to move the lever 30 sidewise to bring the spherical surface 31 of the ball-shaped portion against the underside of the leaf-spring 26, and lifts the end 29 of the spring to the position shown in Fig. 3 in which it engages the flange 23 of the reel and is in position to be engaged by one of the ledges 25 when the reel moves retrograde.

When the lever 30 is swung sidewise as far as the opening 34 in the socket 32 will permit it, the spring 26 engages the spherical surface of the ball-shaped portion 31 of the lever and thus frictionally holds the lever in its set position.

Since the lever has a ball-and-socket mounting in the casing, the sidewise movement to make the back-check pawl operative may be in any direction from the perpendicular with the same result.

At this point it should be noted that the single spring 26 in the device of the present invention performs the following functions: (1) In operated position brakes the reel to prevent overrunning of the reel when the cable is rapidly paid-off (2) prevents backward movement of the reel; (3) by its own resiliency tends to normally maintain itself in inoperative position shown in Fig. 1; (4) holds the control lever in inoperative position against unintentional movements; (5) holds the control lever in operated position shown in Fig. 3; and (6) keeps the ball-shaped portion 31 of the control lever in its socket 32 in the casing.

In the form of the device above described, when the user desires to cause the cable to be re-wound on the reel, the lever 30 is returned by hand to perpendicular position shown in Fig. 1, whereupon the end 29 of the spring 26 moves away from the ledge 25 and allows retrograde movement of the reel.

In the modified form of this invention shown in Figs. 4 and 5, construction of the parts is the same as in the form shown in Figs. 1 to 3, with the exception that the ledges 25a are cut-out at 35 so that, upon retrograde movement of the reel, the end 29 of the spring 26 enters the flange and is raised by the cam surface 36 on the ledge before the end of the spring is struck by a stop-lug 37 formed on this part of the flange, as shown in Fig. 5.

This raising of the leaf-spring back-check pawl is accomplished so that the frictional engagement of the spring against the spherical surface of the ball-shaped portion 31 may be relieved to allow the control lever to return to its inoperative position, shown in Fig. 5, by gravity, the end 29 of the spring being held elevated and in operative position by the ledge 25a. After the trouble lamp or cigar-lighter has been used and it is desired to re-wind the cable, the user merely pulls on the cable to move the reel in unwinding direction indicated by the arrow (Fig. 5) with the result that the ledge 25a is moved from under the spring 26, allowing the same to resiliently move to inoperative position corresponding to its position shown in Fig. 1. The back-check device being thus rendered inoperative, the user allows the cable to be wound on the reel by the action of the spring 24.

Thus it will be seen that with the form of the invention shown in Figs. 4 and 5, it is not necessary for the user to manually move the control lever, as is the case in the form shown in Figs. 1 to 3, but that instead it is merely necessary to jerk the cable so that the reel moves in unwinding direction to release the spring 26 and then allow the cable to be re-wound.

Variations and modifications may be made within the scope of this invention and portions of the improvements may be used without others.

Having thus described the invention, what is claimed as new and for which it is desired to obtain Letters Patent, is:—

1. In combination, a reel casing; a cable-reel journalled in said casing; a spring for turning said reel to wind the cable thereon; a back-check pawl mounted in the casing normally in a non-cooperating position relative to the reel yet capable of cooperating with the reel to stop retrograde movement; a socket in the casing; and a manually operable lever making said back-check pawl operative, said lever having a ball-shaped part bearing in the socket in the casing.

2. In combination, a reel casing; a cable-reel journalled in said casing; a spring for turning said reel to wind the cable thereon; a normally inoperative back-check pawl mounted in the casing adapted to cooperate with the reel to stop retrograde movement of the reel; and a lever mounted directly on said casing within the same for manual operation to render the back-check pawl operative.

3. In combination, a reel casing; a cable-reel journalled in said casing; a spring for turning said reel to wind the cable thereon; a leaf-spring mounted in the casing normally in a noncooperating position relative to the reel and yet capable of cooperating with the reel to stop retrograde movement; and a manually operable lever pivotally mounted on the casing for controlling the leaf-spring and for rendering it operative and inoperative.

4. In combination, a reel casing; a cable-reel journalled in said casing; a spring for turning said reel to wind the cable thereon; a leaf-spring mounted in the casing normally in a noncooperating condition relative to the reel yet adapted to cooperate with the reel to stop retrograde movement of the reel; a socket in the casing; and a manually operable lever for making said leaf-spring operative on said reel, said lever having a ball-shaped part bearing in the socket in the casing.

5. In combination, a reel casing; a cable-reel journalled in said casing; a spring for turning said reel to wind the cable thereon; a leaf-spring mounted in the casing and cooperating with the reel to stop retrograde movement of the reel; a socket in the casing; and a manually operable lever for controlling said leaf-spring operative on said reel, said lever having a ball-shaped part bearing in the socket in the casing, said ball-shaped part having a flat portion engaged by the leaf-spring when the latter is in inoperative position relative to the reel.

6. In combination, a reel casing; a cable-reel journalled in said casing; a spring for turning said reel to wind the cable thereon; a normally inoperative combined brake and back-check pawl mounted on said casing for optional engagement with the reel; and a manually operable lever pivotally mounted on the casing for controlling the said combined brake and back-check pawl and moving it from its normally inoperative position into operative braking and back-checking position.

7. In combination, a reel casing; a spring-biased cable-reel journalled in said casing; a back-check device for said reel; and a lever for controlling said back-check device, said lever being mounted on said casing for universal pivotal movement from a normal perpendicular position in which the back-check device is inoperative to inclined position in which the back-check device is operative.

8. In combination, a reel casing adapted to be secured to the instrument board of a motor vehicle; a spring-biased cable-reel journalled in said casing; a back-check device for said reel; and a lever mounted directly on said casing for controlling said back-check device, said lever protruding beyond the lower edge of said casing such an extent that the lever may be visible below the lower edge of the instrument board while the casing is concealed behind the instrument board.

9. In combination, a reel casing; a spring-biased cable-reel journalled in the casing; a back-check pawl; a stop lug on the reel; and manually operable means for causing the back-check pawl to move to position in which to engage the stop lug on the reel, said pawl resiliently engaging the reel to allow the stop lug to pass in unreeling movement of the reel and resiliently engaging said manually operable means to yieldingly hold the latter in the position to which it is manually moved.

10. In combination, a reel casing; a cable reel journalled in said casing; a spring for turning said reel to wind the cable thereon; a control lever; a ball-and-socket mounting for said lever in said casing; and a device which in operated position brakes the reel to prevent overrunning of the reel when the cable is rapidly paid-off, prevents backward movement of the reel, by its own action tends to normally maintain itself in inoperative position when allowed to remain in that position, holds the control lever in inoperative position against unintentional movements, holds the control lever in operated position when moved to the latter position, and keeps the ball-shaped portion of the control lever in its socket in the casing.

JOSEPH H. COHEN.